(12) United States Patent
Sahoda

(10) Patent No.: US 7,083,874 B2
(45) Date of Patent: Aug. 1, 2006

(54) FUEL CELL POWER GENERATION SYSTEM

(75) Inventor: Katsumi Sahoda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 951 days.

(21) Appl. No.: 09/772,119

(22) Filed: Jan. 26, 2001

(65) Prior Publication Data

US 2003/0077489 A1    Apr. 24, 2003

(30) Foreign Application Priority Data

Jan. 28, 2000    (JP) .............................. 2000-024818

(51) Int. Cl.
*H01M 8/06* (2006.01)
(52) U.S. Cl. .............................. 429/17; 429/19; 429/20
(58) Field of Classification Search .................. 429/17, 429/19, 20
See application file for complete search history.

(56) References Cited

U.S. PATENT DOCUMENTS 5,366,820 A * 11/1994 Tsutsumi et al. ............. 429/19

FOREIGN PATENT DOCUMENTS

| JP | 7-263007 | 10/1995 |
| JP | 11-265724 | * 9/1999 |
| JP | 2000-067898 | * 3/2000 |

* cited by examiner

*Primary Examiner*—Jonathan Crepeau
(74) *Attorney, Agent, or Firm*—Lahive & Cockfield, LLP; Anthony A. Laurentano, Esq.

(57) ABSTRACT

A fuel cell power generation system comprises a hydrogen reservoir that can occlude non-used hydrogen discharged from a fuel cell, and release the same. The hydrogen reservoir has a first storage section comprising an easily hydrogen occluding first hydrogen occlusion material, and a second storage section comprising an easily hydrogen releasing second hydrogen occlusion material. The non-used hydrogen from the fuel cell is once occluded in the first storage section, then the hydrogen obtained by releasing the occluded hydrogen is transferred to and occluded by the second storage section. When the fuel cell starts up, the occluded hydrogen is released from the second storage section, and supplied to the fuel cell.

16 Claims, 8 Drawing Sheets

FUEL CELL POWER GENERATION SYSTEM

BACKGROUND OF THE INVENTION

1. Field of the Invention

The present invention relates to a fuel cell power generation system.

2. Description of the Related Art

Previously, the present Assignee proposed, as a fuel cell power generation system that can compensate a delay in the response of a reformer, one comprising a hydrogen reservoir that can occlude hydrogen generated by the reformer, and release the same, wherein the hydrogen reservoir has a first storage section comprising an easily hydrogen occluding first hydrogen occlusion material which is inclined to occlude hydrogen easily, and a second storage section comprising an easily hydrogen releasing second hydrogen occlusion material which is inclined to release hydrogen easily, and wherein hydrogen from the reformer is once occluded in the first storage section and then, hydrogen obtained by releasing this occluded hydrogen is transferred to the second storage section and occluded there. The occluded hydrogen is released from the second storage section as the fuel cell starts up, and supplied to the fuel cell (refer to Specification and Drawings of Japanese Patent Application No. 11-164939). This hydrogen supply system was developed mainly for loading on automobiles.

In the above proposed system, non-used hydrogen which is not used in the fuel cell is used as fuel of evaporator burner, thus the non-used hydrogen is not wasted. However, during deceleration of an automobile, considerable amount of non-used hydrogen is generated, and it is not economical to simply burn such expensive hydrogen. Moreover, when non-used hydrogen is generated in the evaporator, this hydrogen is eventually discharged in the atmosphere, and when this discharged hydrogen amount increases, this leads to lower fuel-efficiency and lower energy efficiency of the whole system.

SUMMARY OF THE INVENTION

It is an object of the present invention to provide a fuel cell power generation system wherein non-used hydrogen in a fuel cell is stored so that it can be used, for instance, as starting-up hydrogen for the fuel cell, thereby improving the fuel-efficiency and the energy efficiency of the whole system.

In order to achieve the above object, the present invention provides a fuel cell power generation system comprising a hydrogen reservoir that can occlude non-used hydrogen discharged from a fuel cell, and release the same, wherein the hydrogen reservoir has a first storage section comprising an easily hydrogen occluding first hydrogen occlusion material, and a second storage section comprising an easily hydrogen releasing second hydrogen occlusion material, the first storage section having a function to occlude once non-used hydrogen from the fuel cell and to release the occluded hydrogen, and the second storage section having a function to occlude hydrogen released from the first storage section and then to release the occluded hydrogen and supply to said fuel cell.

With the above arrangement, it is possible to use non-used hydrogen in a fuel cell, for instance, as starting-up hydrogen for the fuel cell, and thereby, resolving an uneconomical simple burning of non-used hydrogen, and improving the fuel-efficiency and the energy efficiency of the whole system.

The aforementioned objects and other objects, features and advantages according to the present invention will be understood more obviously by reading the following description of the preferred embodiment referring to the attached drawings.

DESCRIPTION OF THE PREFERRED EMBODIMENT

Figure 1:
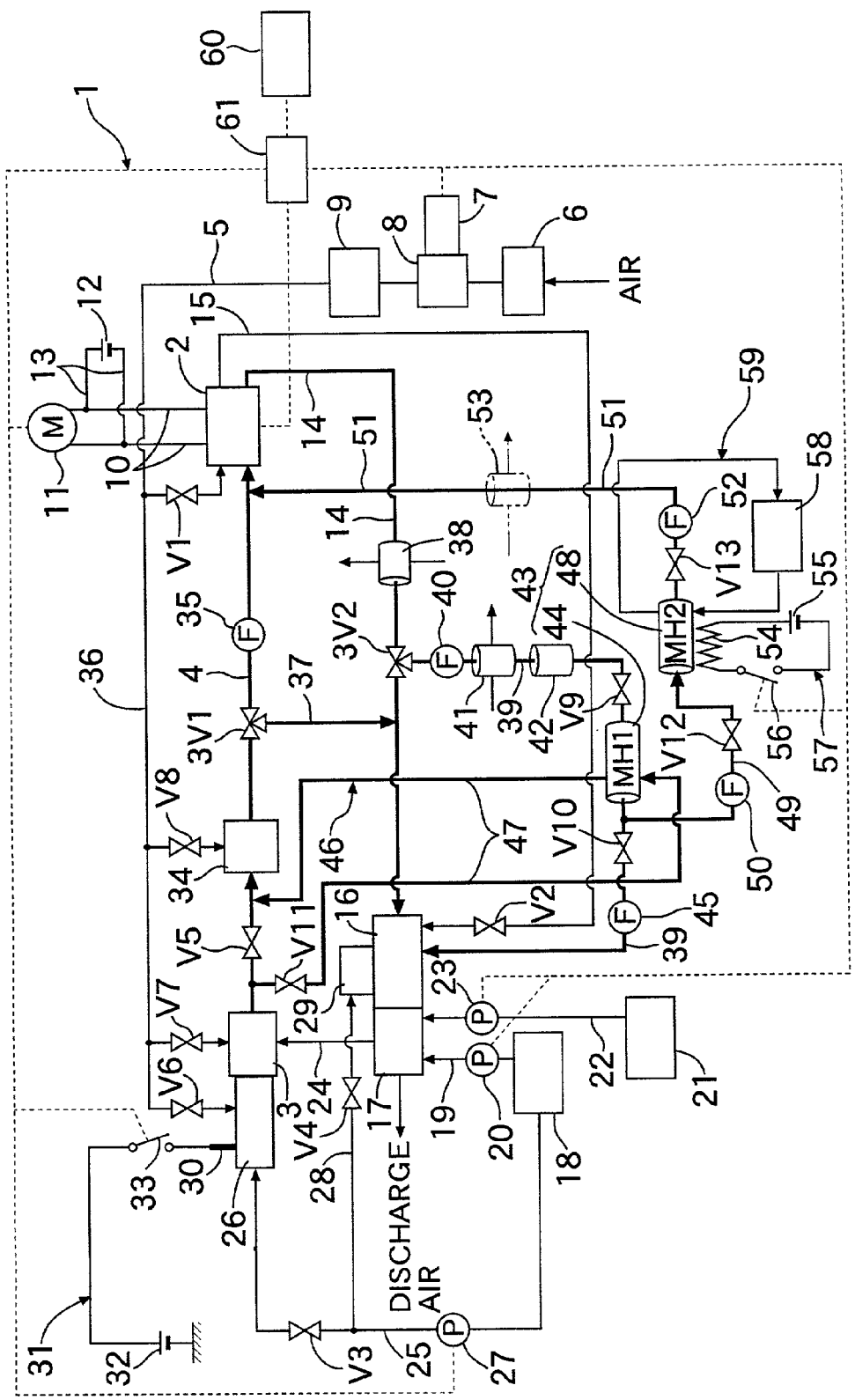
FIG. 1 is a view explaining an example of a fuel cell power generation system.

A fuel cell power generation system 1 shown in FIG. 1 is loaded on an electric vehicle using a fuel cell 2 as a power source.

In the fuel cell power generation system 1, a reformer 3 generates reformed gas containing mainly hydrogen from a base fuel such as alcohol, gasoline or the like, and its supply side is connected to the reformed gas inlet side of the fuel cell 2 through a supply conduit 4. In an air supply conduit 5, an air cleaner 6, a supercharger 8 having a motor 7 and an inner cooler 9 are provided on its introduction side, while its delivery side is connected to the air inlet side of the fuel cell 2. A first two-way valve V1 is provided in the proximity of the fuel cell 2 of its supply conduit 5. A pair of connection terminals of the fuel cell 2 are connected to a vehicle driving motor 11 through a pair of conductors 10, while a pair of connection terminals of a motor driving auxiliary battery 12 are connected to these conductors 10 through a pair of conductors 10.

The reformed gas outlet side and the air outlet side of the fuel cell 2 are connected to an evaporator burner 16 respectively through discharge conduits 14, 15, and a second two-way valve V2 is provided in the proximity of the burner 16 of the air discharge conduit 15. One outlet side of a methanol tank 18 is connected to one inlet side of the evaporator 17 through a supply conduit 19, and a pump 20 is provided on this supply conduit 19. Moreover, the outlet side of a water tank 21 is connected to the other inlet side of the evaporator 17 through a supply conduit 22, and a pump 23 is provided on this supply conduit 22. The outlet side of the evaporator 17 is connected to the introduction side of the reformer 3 through a supply conduit 24 for mixed vapor composed of methanol and water. The other outlet side of the methanol tank 18 is connected to a reformer start-up burner 26 through other supply conduit 25, and a pump 27 and a third two-way valve V3 are disposed in this order from the methanol tank 18 on this supply conduit 25. Moreover, the supply conduit 25, between the pump 27 and the third two-way valve V3, is connected to an electric heat catalyzer 29 of the evaporator burner 16 through another supply conduit 28, and a fourth two-way valve V4 is provided in the proximity of the electric heat catalyzer 29 of this supply conduit 28. The reformer start-up burner 26 is provided with a heating circuit 31 including a glow plug 30, a battery 32 and a switch 33 situated between the battery 32 and the burner 26.

A fifth tow-way valve V5, a CO remover 34, a first three-way valve 3V1 and a flow meter 35 are disposed on the reformed gas supply conduit 4 in this order from the reformer 3 side. In the air supply conduit 5, a supply conduit 36 branched from an upstream side of the first two-way valve V1 in the proximity of the fuel cell 2 branches further into three and is connected to the reformer start-up burner 26, the reformer 3 and the CO remover 34. Sixth to eighth two-way valves V6 to V8 are provided in the proximity of the burner 26 of this supply conduit 36, in the proximity of the reformer 3 and in the proximity of the CO remover 34 respectively. Air is used for combustion and temperature control in the burner 26, for temperature control in the reformer 3, and for oxidation of CO contained in the reformed gas to $CO_2$ in the CO remover 34. The first three-way valve 3V1 situated at the outlet side of the CO remover 34 is connected to the reformed gas discharge conduit 14 of the fuel cell 2 through a first bypass conduit 37.

A heat exchanger 38 and a second three-way valve 3V2 are provide in this order from the fuel cell 2 side between a connection section of the fuel cell 2 and the first bypass conduit 37 in the reformed gas discharge conduit 14. The second three-way valve 3V2 and the evaporator burner 16 are connected by a second bypass conduit 39, and a flow meter 40, a heat exchanger 41, a moisture remover 42, a ninth two-way valve V9, a first storage section 44 of a hydrogen reservoir 43, a tenth two-way valve V10 and a flow meter 45 are disposed in this order from the second three-way valve 3V2 side on the second bypass conduit 39.

A first storage section 44 includes a so-called through type tank having an inlet and an outlet, and the inlet is connected to the upstream side of the second bypass conduit 39 and the outlet to the downstream side of the second bypass conduit 39 respectively. A heater 46 is attached to the first storage section 44. This heater 46 include a reformed gas circulation conduit 47, and the inlet side of this conduit 47 is connected between the reformer 3 and the fifth two-way valve V5 on the reformed gas supply conduit 4, and the outlet side thereof is connected between the fifth two-way valve V5 and the CO remover 34. An eleventh two-way valve V11 is provided at the inlet side of the conduit 47.

A second storage section 48 of a hydrogen reservoir 43 includes a through type tank having an inlet and an outlet. This inlet is connected to the second bypass conduit 39 between the outlet of the first storage section 44 and the tenth two-way valve V10 by a transfer conduit 49 moving hydrogen from the first storage section 44 to the second storage section 48, and a flow meter 50 and a twelfth two-way valve V12 are provided on the conduit 49 in this order from the first storage section 44 side. The outlet of the second storage section 48 is connected between the flow meter 35 and the fuel cell 2 of the reformed gas supply conduit 4 through a hydrogen supply conduit 51. A thirteenth two-way valve V13 and a flow meter 52 are provided in the supply conduit 51 in this order from the second storage section 48 side. In the downstream side of the flow meter 52, a heat exchanger 53 is provided on the supply conduit 51 where necessary to improve the temperature control precision.

A heating circuit 57 having a heater 54, a battery 55 and a switch 56 and a cooling circuit 59 having a cooling section 58 which comprises a radiator, a water pump, a water tank, or the like are attached to the second storage section 48.

The switch 33 of the heating circuit 31 having the fuel cell 2, vehicle driving motor 11 and glow plug 30, and the switch 56 or the like of the heating circuit 57 having respective pumps 20, 23, 27 and a heater 54, are controlled to operate through a ECU 61 by putting a start-up switch 60 in ON state, and controlled not to operate by putting the start-up switch 60 in OFF state.

Figure 2:
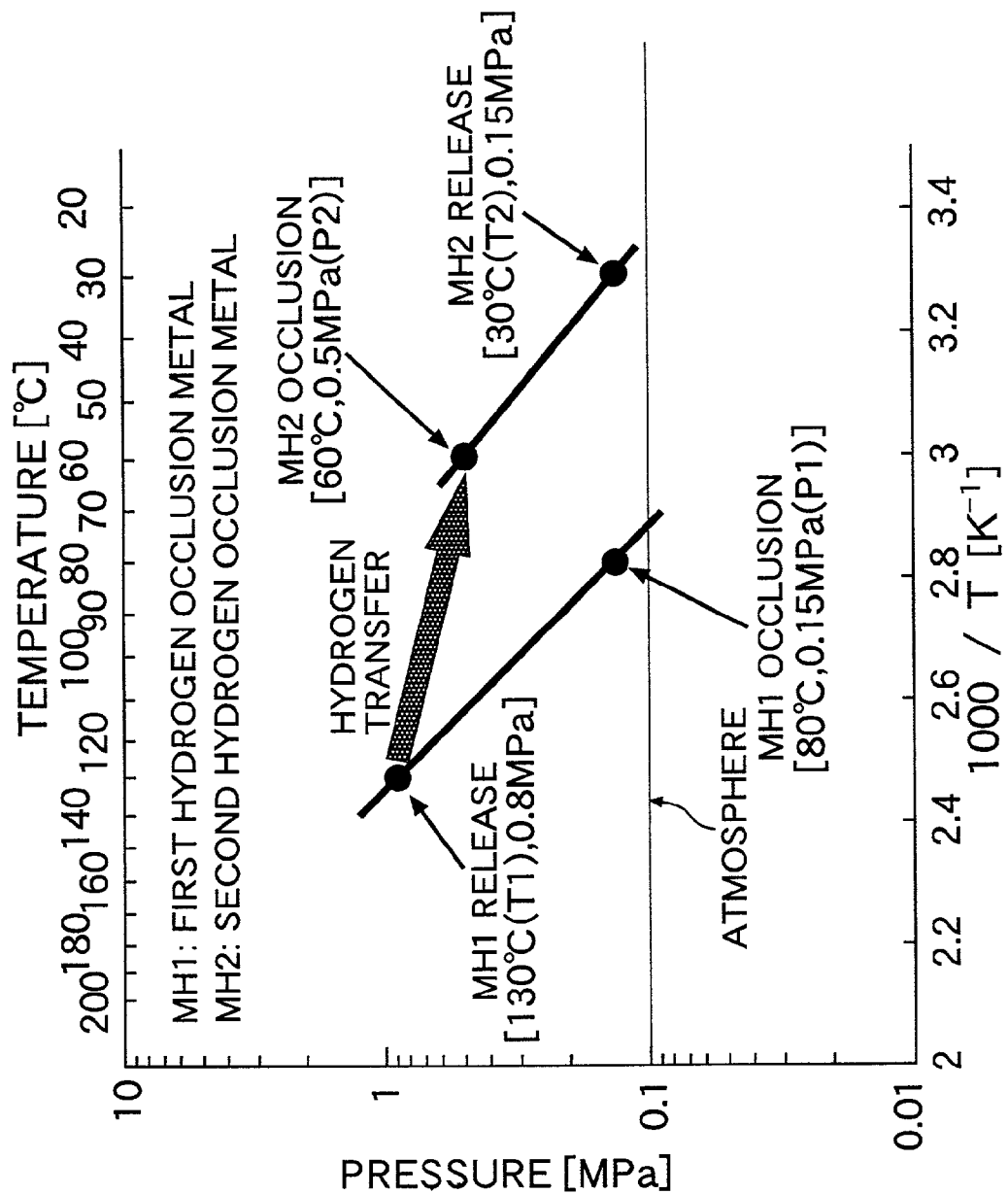
FIG. 2 is a graph showing a hydrogen occlusion and release characteristics chart of a first and a second hydrogen occluding alloy.

The hydrogen reservoir 43 can occlude non-used hydrogen discharged from the fuel cell 2 and release the same. The through type tank of its first storage section 44 is filled with a first hydrogen occlusion alloy MH1 as an easily hydrogen occluding first hydrogen occlusion material. In addition, the through type tank of its second storage section 51 is filled with a second hydrogen occlusion alloy MH2 as an easily hydrogen occluding second hydrogen occlusion material. As shown in FIG. 2, the first hydrogen occlusion alloy MH1 is low pressure occlusion and high temperature release type, has characteristics to occlude hydrogen at 80° C., 0.15 MPa (P1) and to release hydrogen at 130° C. (T1), 0.8 MPa. $LaNi_{3.96}Co_{0.6}Al_{0.44}$ alloy is used as such hydrogen occlusion alloy. The second hydrogen occlusion alloy MH2 is high pressure occlusion and low temperature release type, has characteristics to occlude hydrogen at 60° C., 0.5 MPa (P2) and to release hydrogen at 30° C. (T2), 0.15 MPa. $MmNi_{4.04}Co_{0.6}Mn_{0.31}Al_{0.05}$ alloy (Mm is mish metal) is used as such hydrogen occlusion alloy. Therefore, the relationship P1<P2, T1>T2 are established between both hydrogen occlusion pressures P1, P2 and both hydrogen release temperatures T1, T2.

When hydrogen is to be transferred from the first storage section 44 to the second storage section 48, the aforementioned composition allows to introduce high release pressure hydrogen from the first storage section 44 to the second storage section 48 under a high temperature taking profit of hydrogen release characteristics of the first hydrogen occlusion alloy MH1, and forcibly occlude this hydrogen by the second hydrogen occlusion alloy MH2 rapidly and sufficiently. On the other hand, hydrogen is released from the second storage section 48 at a low temperature.

Next, respective modes will de described referring to FIG. 1 and FIG. 3 to FIG. 8.

A. Start-up Mode

Before starting this mode, hydrogen occlusion amount is full in the second storage section 48 of the hydrogen reservoir 43. The first to thirteenth two-way valves V1 to V13 are in "closed" state, and the first three-way valve 3V1 is changed over, namely to the discharge conduit side 14, to supply the discharge conduit 14 with the reformed gas, while the second three-way valve 3V2 is switched over, namely to the burner 16 side, to supply the evaporator burner 16 with the discharge gas.

Figure 3:
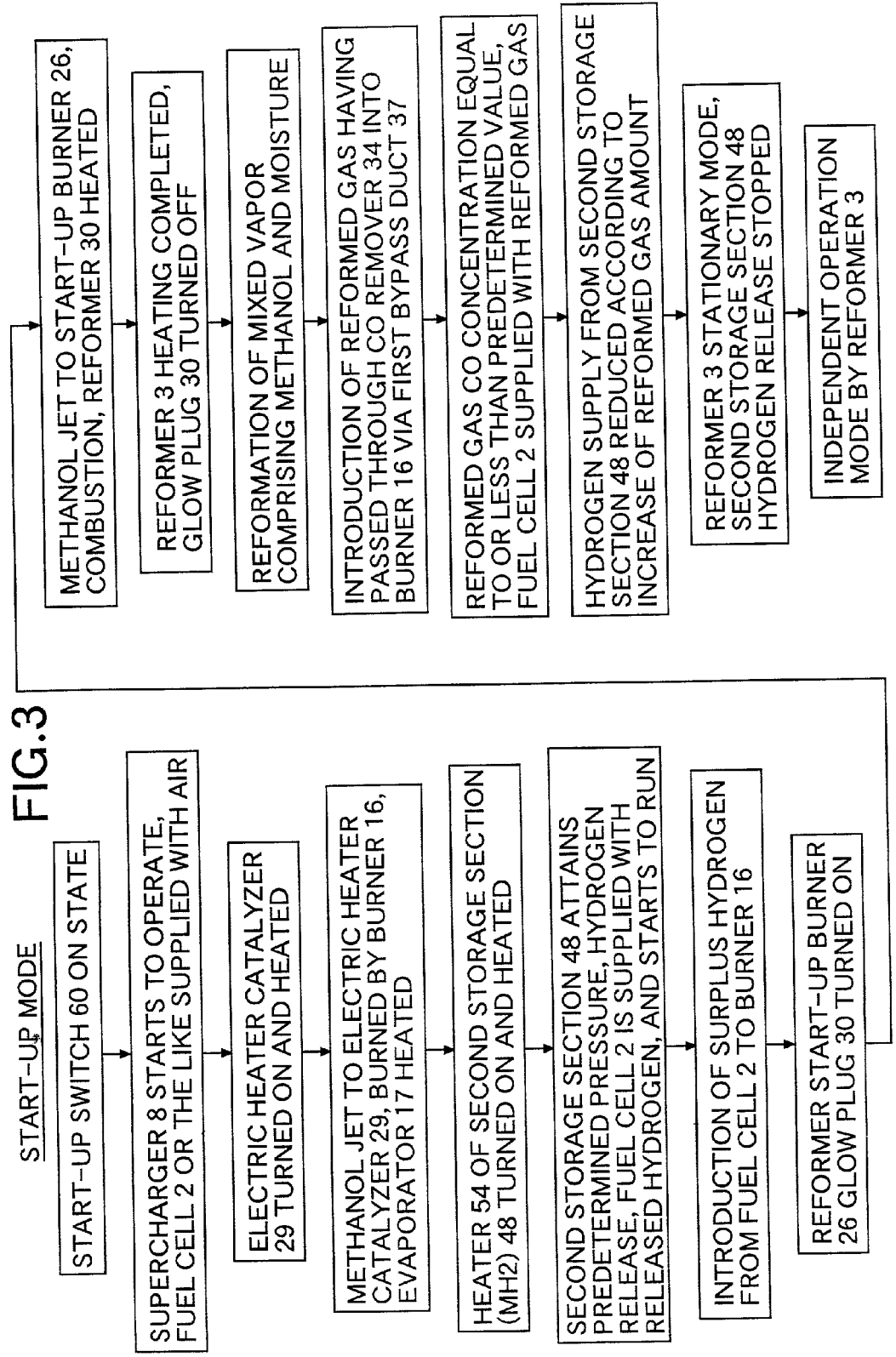
FIG. 3 is a start-up mode flow chart.

In FIG. 1 and FIG. 3, when a start-up switch 60 is put ON, a supercharger 8 runs, the fuel cell 26 is supplied with air through an air cleaner 6, the supercharger 8 and an intercooler 9, with the first two-way valve V1 "open", and air is supplied to the burner 26 of the reformer 3, the reformer 3 and the CO remover 34 respectively with sixth to eighth two-way valve V6 to V8 "open". Air discharged from the fuel cell 2 is introduced into the evaporator burner 16 with the second two-way valve V2 "open".

When the electric heater catalyzer 29 of the evaporator burner 16 is turned on and heats up, the pump 27 operates and, at the same time, methanol is projected to the electric heater catalyzer 29 with the fourth two-way valve V4, and this methanol is burned in the burner 16 to heat the evaporator 17.

The switch 56 of the heating circuit 57 of the second storage section 48 is closed and this second storage section 48 is heated by the heater 54. In this case, the second storage section 48, namely the second hydrogen occlusion metal MH2 can be heated to about 30° C., hydrogen release temperature, in a short period of time. Then, the pressure of the outlet portion of the second storage section 48 is detected, and when the pressure attains about 0.15 MPa, occluded hydrogen is released from the second storage section 48, and this released hydrogen is supplied to the fuel cell 2, with the thirteenth two-way valve V13 "open", and it begins to operates. Hydrogen supply amount from the second storage section 48 is detected by a flow meter 52. As the second three-way valve 3V2 is switched over to the burner 16 side, non-used hydrogen of the fuel cell 2 is introduced into the evaporator burner 16, and burned there to heat the evaporator 17.

In the reformer start-up burner 26, the switch 33 of the heating circuit 31 having the glow plug 30 is closed to turn on the glow plug 30. Methanol is projected to the burner 26 with the three-way valve 3V "open" and the reformer 3 is heated by combustion of this methanol. The gas temperature is detected at the supply inlet portion of the reformer 3 and when it attains a predetermined value, the switch 33 opens as reformer 3 heating completed, to turn off the glow plug 30.

Methanol and water are projected to the evaporator 17 to generate mixed vapor comprising methanol and water, and this mixed vapor is supplied to the reformer 3 and reformed.

The reformed gas, containing a considerable amount of CO, is introduced in the CO remover 34 with the fifth two-way valve V5 "open". Then, as the first three-way valve 3V1 is switched over to the burner 16 side, the reformed gas is introduced into the burner 16 through the first bypass conduit 37, and hydrogen and other combustible components are burned.

Through the detection of reformed gas CO concentration, or investigation of CO concentration from the relationship between reformed gas temperature and time, when this CO concentration becomes equal to or less than a predetermined value, the first three-way valve 3V1 is switched over to the fuel cell 2 side, and the fuel cell 2 is supplied with the reformed gas.

Reformed gas amount from the reformer 3 during warm-up is not enough for operating the fuel cell 2, however, this lack is compensated by hydrogen released from the second storage section 48, thereby allowing to stabilize the output from the fuel cell 2. According to the increase of reformed gas amount, hydrogen supply amount is controlled to reduce gradually.

When the reformed gas temperature and pressure at the supply inlet section of the reformer 3 attain about 200° C. and 0.16 MPa respectively, it is judged that the reformer 3 has attained the stationary mode, the switch 56 of the heating circuit 57 opens, the thirteenth two-way valve V13 of the second storage section 48 side closes, and thereafter, it passes to the independent operation mode by the reformer 3, to perform the stationary running.

B. Hydrogen Transfer Mode

As mentioned below, non-used hydrogen discharged from the fuel cell 2 during deceleration or idling, is occluded by its first storage section 44 as the second three-way valve 3V2 is switched to the first storage section 44 side of the hydrogen reservoir 43, so the hydrogen occlusion amount of the first storage section 44 is full before starting the hydrogen transfer mode.

Figure 4:
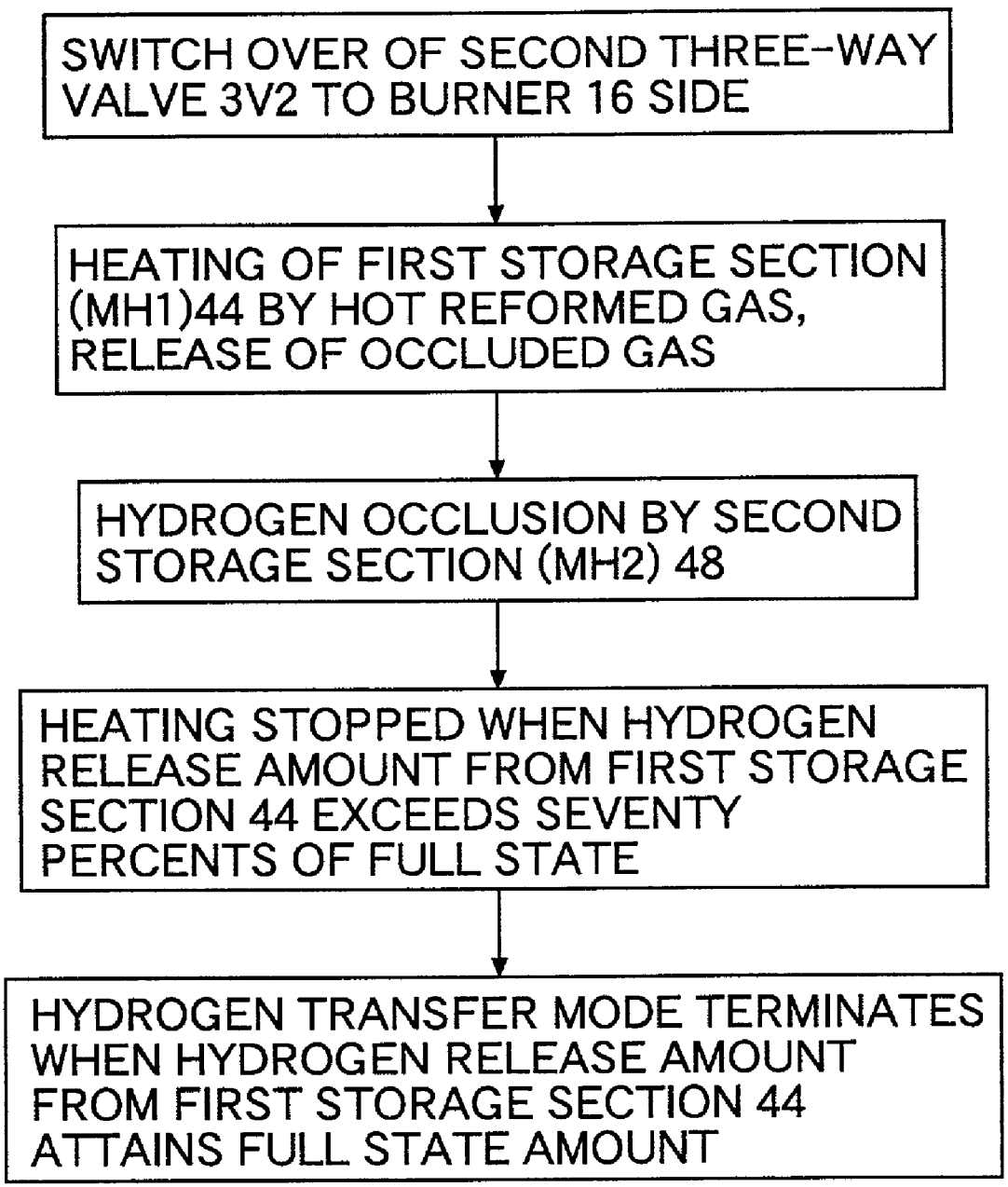
FIG. 4 is a hydrogen transfer mode flow chart.

This hydrogen transfer mode is performed mainly during the stationary running. As shown in FIG. 1 and FIG. 4, when hydrogen occlusion amount of the first storage section 44 attains full, the second three-way valve 3V2 is changed over to the evaporator burner 16 in order to transit to the hydrogen transfer mode.

Hydrogen can transfer with the ninth, tenth and thirteenth two-way valves V9, V10 and V13 "closed", and the twelfth two-way valve V12 "open". In addition, with the eleventh two-way valve V11 "open" and the fifth two-way valve V5 "closed", a hot reformed gas of about 200° C. passes through the heater 46 and then CO remover 34 or the like, and is supplied to the fuel cell 2, to sustain its operation.

When the first hydrogen occlusion metal MH1 of the first storage section 44 is heated up to about 130° C., and the pressure increases to about 0.8 MPa, occluded hydrogen will be released.

The second hydrogen occlusion metal MH2 of the second storage section 48 is heated up to about 60° C. by the heating circuit 57, and hydrogen released from the first storage section 44 is occluded by the second hydrogen occlusion metal MH2 at about 60° C., 0.5 MPa. The temperature elevation of the alloy MH2 due to this occlusion is controlled by the cooling circuit 59, and its temperature will be held at about 60° C.

When the flow meter 50 placed at the outlet side of the first storage section 44 detects, for instance, that the hydrogen release amount exceeds seventy percents of the full state, before the occluded hydrogen amount of the first storage section 44 becomes zero, the heating of the first storage section 44 is stopped with the fifth two-way valve V5 "open" and the eleventh two-way valve V11 "closed". The first storage section 44 continues to release hydrogen by the endoergic reaction of the first hydrogen occlusion metal MH1 using its remaining heat. This allows to lower the temperature of the first storage section 44 and to reduce the time lag for resuming the next hydrogen occlusion mode.

When the integral flow amount of the flow meter 50 situated at the outlet side of the first storage section 44 attains the amount of full state of this first storage section 44, hydrogen transfer to the second storage section 48 is stopped with the twelfth two-way valve V12 "closed". At this moment, the hydrogen occlusion amount in the second storage section 48 is determined full.

C. Acceleration Mode

When the accelerator operation amount exceeds a predetermined value, it passes to the acceleration mode, to increase mixed vapor (methanol and moisture) to the reformer 3. In this case, as non-used hydrogen amount released from the fuel cell 2 is small, the second three-way valve 3V2 is switched over, for instance, to the evaporator burner 16 side. The acceleration mode terminates when the accelerator operation amount becomes equal to or less than the predetermined value.

D. Deceleration Mode

Figure 5:
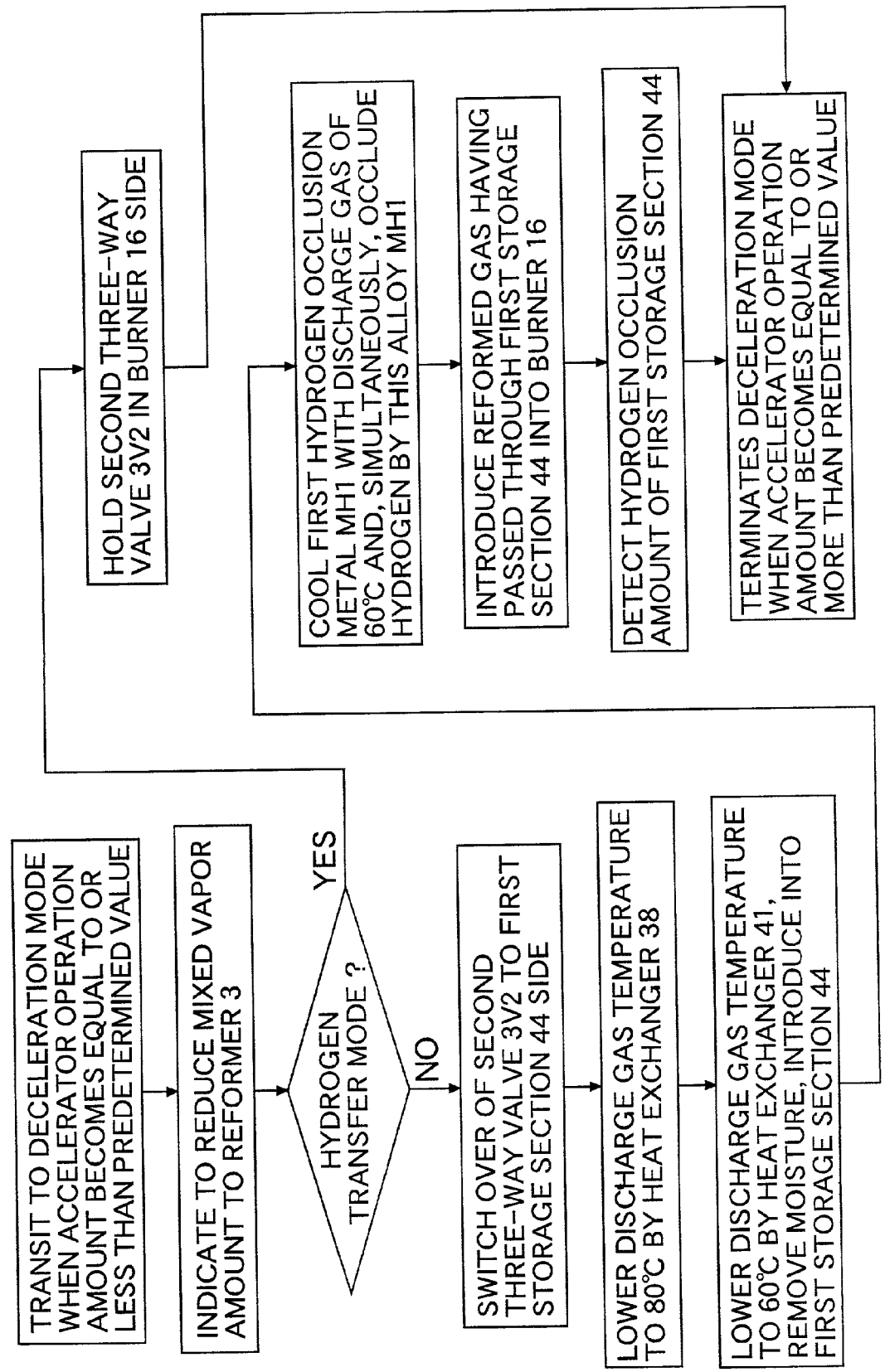
FIG. 5 is a deceleration mode flow chart.

As shown in FIG. 1 and FIG. 5, when the accelerator operation amount becomes equal to or less than the predetermined value, it passes to the deceleration mode, to decrease mixed vapor (methanol and moisture) to the reformer 3.

It is determined whether the hydrogen transfer mode is carried out or not, and if the hydrogen transfer mode is not carried out, the second three-way valve 3V2 is switched over to the first storage section 44 side, to occlude non-used hydrogen discharged from the fuel cell 2 in the first storage section 44.

More specifically, discharged gas discharged from the fuel cell 2 passes through the heat exchanger 38 where cooling water of 50° C. is circulated, its temperature lowers to about 80° C., and the pressure lowers to about 0.15 MPa respectively.

The discharge gas is cooled down to about 60° C. by the heat exchanger 41 where cooling water of 50° C. is circulated, and then its moisture will be removed by the moisture remover 42.

With the ninth and tenth two-way valves V9, V10 "open", discharge gas of about 60° C., 0.15 MPa is introduced into the first storage section 44, and its non-used hydrogen is occluded in the first hydrogen occlusion metal MH1. This occlusion increases the temperature of the alloy MH1 to about 80° C., and this temperature is held by the cooling effect of the reformed gas of about 60° C.

After having passed through the first storage section 44, the discharge gas is introduced to the burner 16 through the tenth two-way valve V10 and the flow meter 45. The hydrogen occlusion amount in the first storage section 44 is detected by the integral flow amount difference of both flow meters 40, 45 situated at the inlet side and the outlet side of the first storage section 44.

The deceleration mode terminates when the accelerator operation amount exceeds the predetermined value.

On the other hand, if the second three-way valve 3V2 is switched over to the burner 16 side from the beginning, and the hydrogen transfer mode is performed, this switched over state of this second three-way valve 3V2 to the burner 16 side is held.

E. Idling Mode

Figure 6:
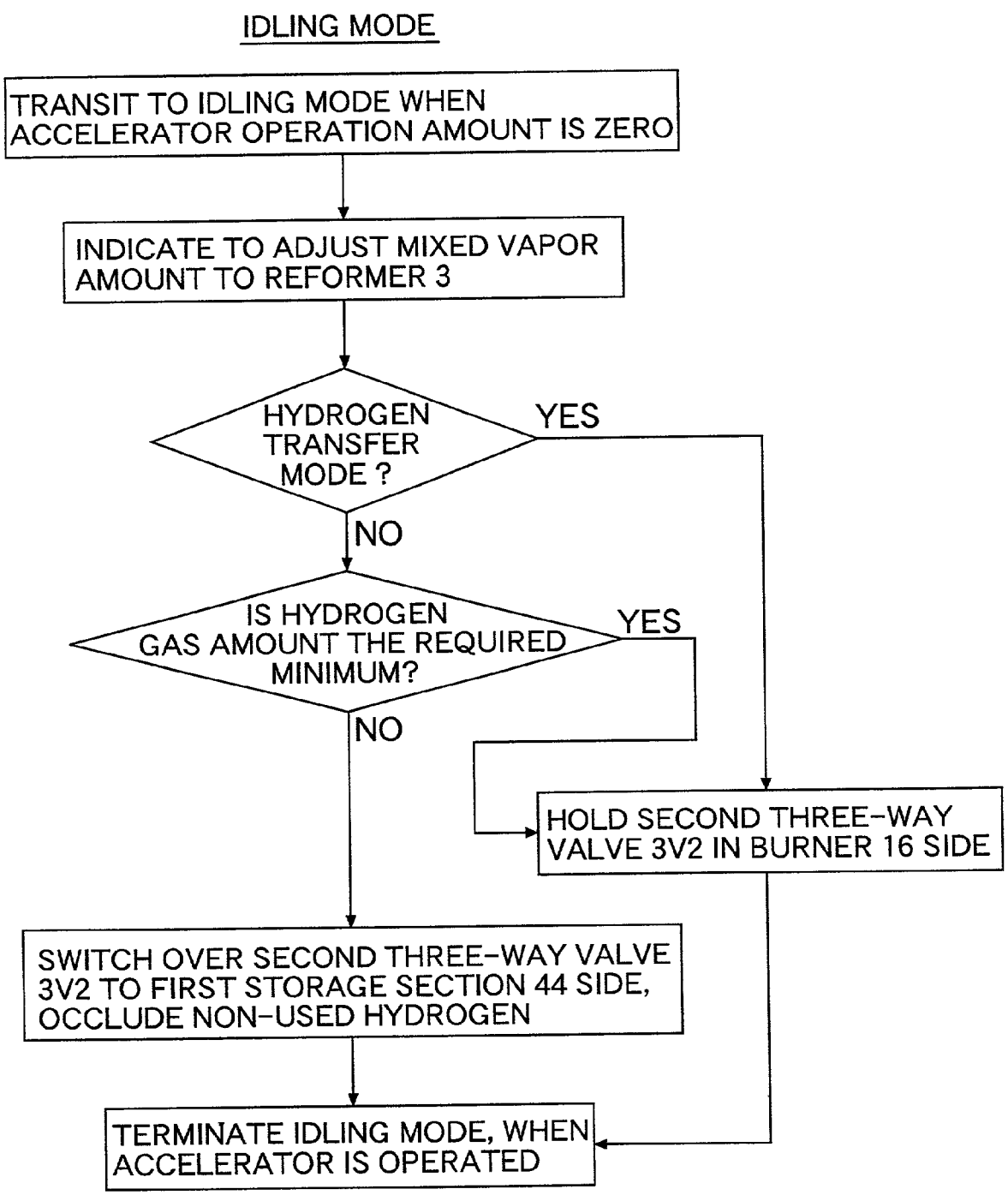
FIG. 6 is an idling mode flow chart.

As shown in FIG. 1 and FIG. 6, when the accelerator operation amount is zero, it passes to the idling mode, and mixed vapor (methanol and moisture) amount to the reformer 3 is controlled to the idling state.

It is determined whether the hydrogen transfer mode is carried out or not, and if the hydrogen transfer mode is not carried out, it is determined whether the reformed gas amount is the required minimum or not, and if it is not the required minimum, the second three-way valve 3V2 is switched over to the first storage section 44 side and non-used hydrogen is occluded in the first storage section 44.

When the accelerator is operated, the idling mode terminates.

On the other hand, if the second three-way valve 3V2 is switched over to the burner 16 side from the beginning, and the hydrogen transfer mode is carried out, and when the reformed gas amount is the required minimum, this the second three-way valve 3V2 is maintained in the switched over state to the burner 16 side.

F. Stop Mode

Figure 7:
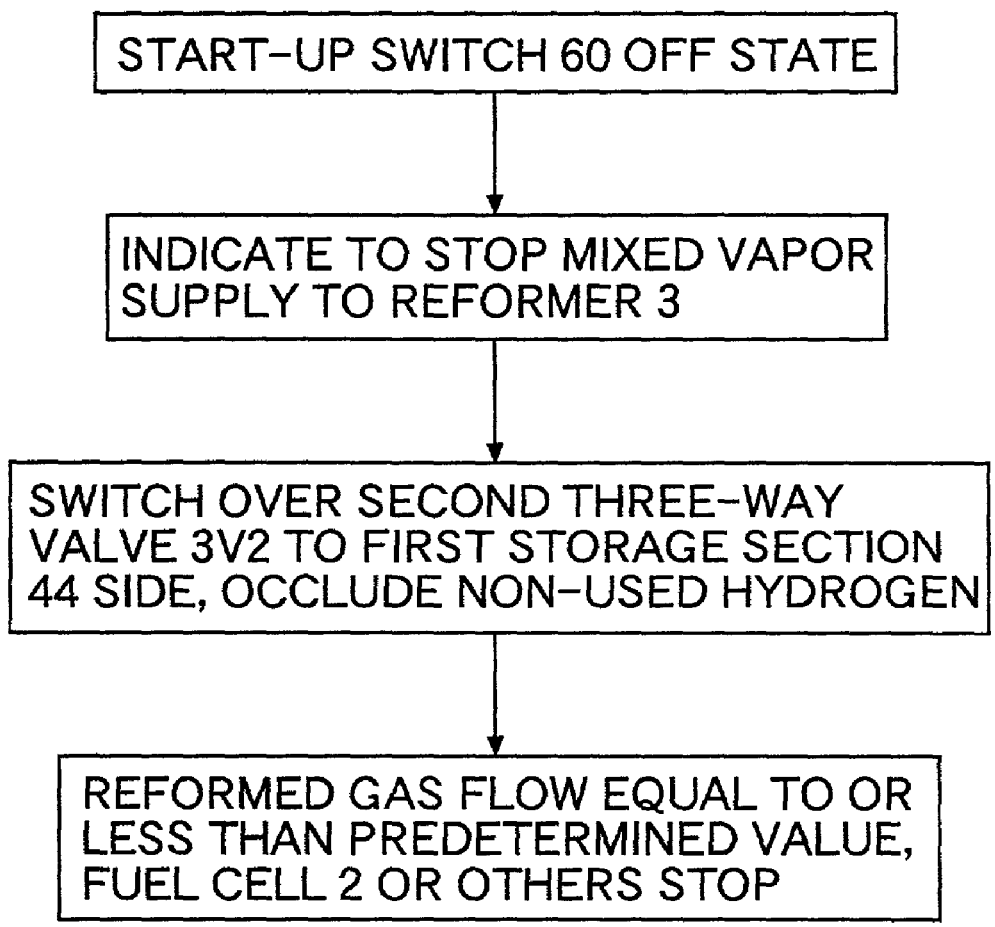
FIG. 7 is a stop mode flow chart.

As shown in FIG. 1 and FIG. 7, when the start-up switch 60 is turned OFF, the supply of mixed vapor (methanol and moisture) to the reformer 3 is stopped.

The second three-way valve 3V2 is switched over to the first storage section 44 side, and when the supply of mixed vapor is stopped, surplus hydrogen generated by the remaining mixed vapor of the reformer 3 is occluded by the first storage section 44 through the fuel cell 2. When the reformed gas flow amount becomes equal to or less than the predetermined value, the fuel cell 2, the reformer 3, or the like stop.

Figure 8:
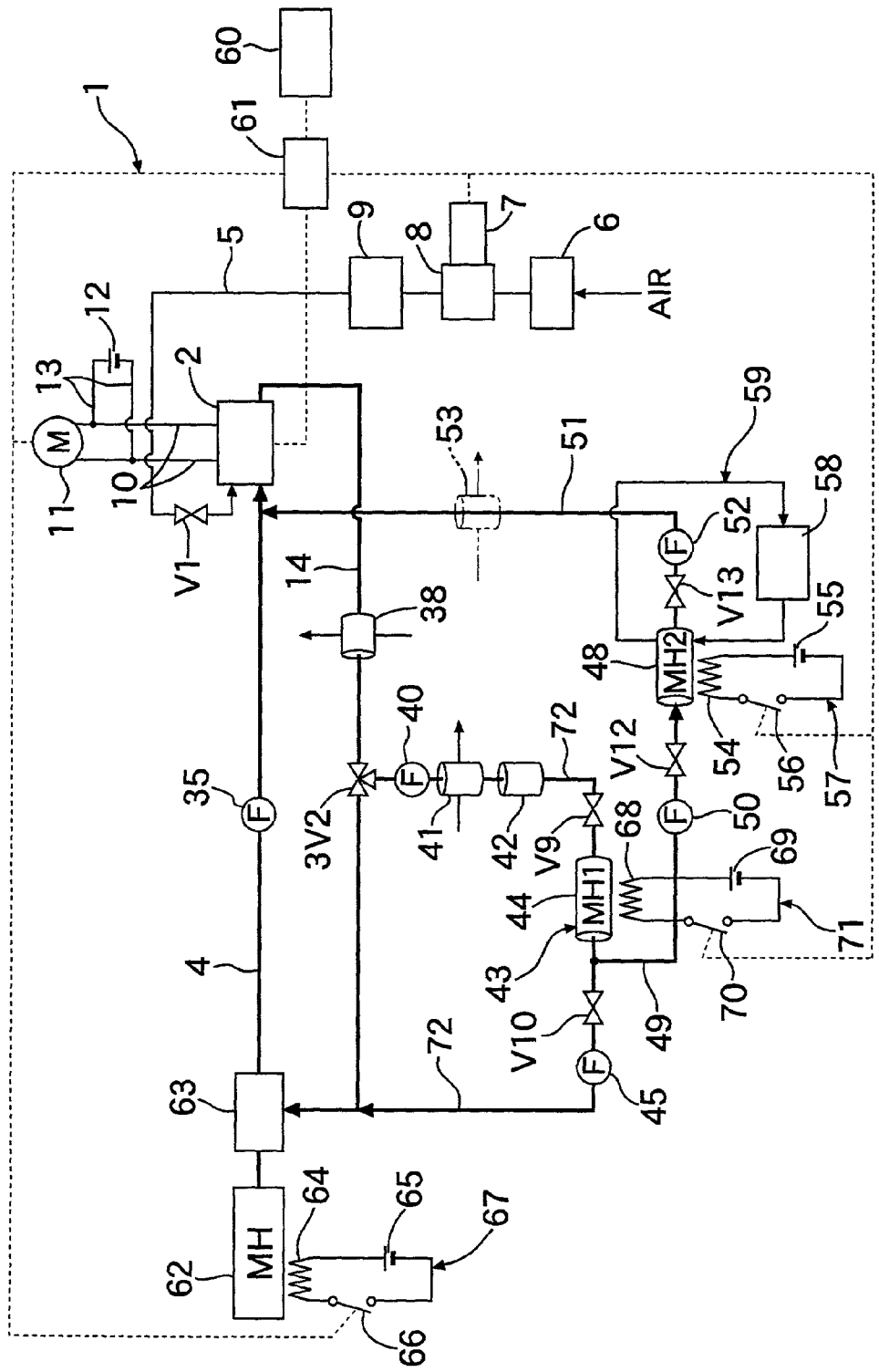
FIG. 8 is a view explaining another example of a fuel cell power generation system.

The hydrogen supply system 1 shown in FIG. 8 uses a hydrogen tank 62 filled with hydrogen occlusion metal MH which is a hydrogen occluding material, as hydrogen supply source to the fuel cell 2, and its release hydrogen is supplied to the fuel cell 2 by an injector 63 through the supply conduit 4. For example, $LaNi_5$ base alloys are used as hydrogen occlusion metal MH to be charged in the hydrogen tank 2. The hydrogen release temperature is 80° C. therefore, the hydrogen tank 62 is provided with a heating circuit 67 including a heater 64, a battery 65 and a switch 66.

In addition, a heading circuit 71 for hydrogen release including a heater 68, a battery 69 and a switch 70 is attached to the first storage section 44.

The discharge conduit 14 extending from the hydrogen outlet side of the fuel cell 2 is connected to the an injector 63, and a bypass conduit 72 provided with the first storage section 44 or the like is disposed on the discharge conduit 14.

As the other arrangement is substantially similar to that of FIG. 1, the same numerals refer to the similar components in FIG. 1 and their detailed description will be omitted.

When the fuel cell 2 starts to run, the second storage section 48 releases hydrogen, the hydrogen occlusion metal MH in the hydrogen tank 62 is heated up to about 80° C., and hydrogen supply from the second storage section 48 is stopped when the hydrogen release amount from the hydrogen tank 62 attains the stationary value. During acceleration, deceleration and idling, the hydrogen release amount is adjusted by the injector 63.

What is claimed is:

1. A fuel cell power generation system, comprising a hydrogen reservoir that occludes non-used hydrogen discharged from a fuel cell, and releases the same, wherein said hydrogen reservoir has a first storage section comprising a first hydrogen occlusion material, and a second storage section comprising a second hydrogen occlusion material, said first storage section being adapted to occlude said non-used hydrogen from said fuel cell and to release the occluded hydrogen, and said second storage section being adapted to occlude hydrogen released from said first storage section and then to release and supply the occluded hydrogen to said fuel cell, wherein the first hydrogen occlusion material is of a low pressure occlusion and high temperature release type and the second hydrogen occlusion material is of a high pressure occlusion and low temperature release type, wherein the first hydrogen occlusion material is a $LaNi_{3.96}Co_{0.6}Al_{0.44}$ alloy and the second hydrogen occlusion material is a $MmNi_{4.04}Co_{0.6}Mn_{0.31}AL_{0.05}$ alloy (Mm is mish metal).

2. A fuel cell power generation system according to claim 1, wherein said fuel cell is supplied with hydrogen from said second storage section when the fuel cell starts up.

3. A fuel cell power generation system according to claim 1, wherein said first storage section is heated when said first storage section is made to release the occluded hydrogen.

4. A fuel cell power generation system according to claim 3, wherein the heating of said first storage section is stopped before the occluded hydrogen amount of said first storage section becomes zero.

5. A fuel cell power generation system according to claim 1, wherein said first storage section is provided with a through type tank having an inlet and an outlet.

6. A fuel cell power generation system according to claim 1, wherein a heat exchanger is provided in a supply conduit between said second storage section and said fuel cell.

7. A fuel cell power generation system according to claim 2, wherein said first storage section is heated when said first storage section is made to release the occluded hydrogen.

8. A fuel cell power generation system according to claim 7, wherein the heating of said first storage section is stopped before the occluded hydrogen amount of said first storage section becomes zero.

9. A fuel cell power generation system according to claim 2, wherein said first storage section is provided with a through type tank having an inlet and an outlet.

10. A fuel cell power generation system according to claim 2, wherein a heat exchanger is provided in a supply conduit between said second storage section and said fuel cell.

11. A power generation method in a fuel cell system including a first storage section having a first hydrogen occlusion material, and a second storage section having a second hydrogen occlusion material, the method comprising the steps of:
 said first storage section occluding non-used hydrogen discharged from a fuel cell and releasing hydrogen occluded in the first hydrogen occlusion material, and
 said second storage section occluding said hydrogen released from said first storage section and releasing hydrogen occluded in the second hydrogen occlusion material to said fuel cell, wherein the first hydrogen occlusion material is of a low pressure occlusion and high temperature release type and the second hydrogen occlusion material is of a high pressure occlusion and low temperature release type, wherein the first occlusion material is a $LaNi_{3.96}Co_{0.6}Al_{0.44}$ alloy and the second hydrogen occlusion material is a $MmNi_{4.04}Co_{0.6}Mn_{0.31}Al_{0.05}$ alloy (Mm is mish metal).

12. A power generation method according to claim 11, wherein said fuel cell is supplied with hydrogen from said second storage section when said fuel cell starts up.

13. A power generation method according to claim 11, wherein said first storage section is heated when said first storage section is made to release said hydrogen occluded in the first hydrogen occlusion material.

14. A power generation method according to claim 13, wherein heating of said first storage section is stopped before the occluded hydrogen amount of said first storage section becomes zero.

15. A power generation method according to claim 11, wherein said first storage section is provided with a through type tank having an inlet and an outlet.

16. A power generation method according to claim 11, wherein a heat exchanger is provided in a supply conduit between said second storage section and said fuel cell.

* * * * *